United States Patent [19]

Lee

[11] 4,448,085

[45] May 15, 1984

[54] FORCE TRANSDUCER

[75] Inventor: Shih-Ying Lee, Lincoln, Mass.

[73] Assignee: Setra Systems, Inc., Acton, Mass.

[21] Appl. No.: 265,087

[22] Filed: May 19, 1981

[51] Int. Cl.³ .......................... G01L 1/14; G01G 3/08
[52] U.S. Cl. .............................. 73/862.64; 177/210 C; 177/229
[58] Field of Search ............ 73/780, 718, 724, 862.62, 73/862.64; 177/210 C, 229; 361/283

[56] References Cited

U.S. PATENT DOCUMENTS

| | | | |
|---|---|---|---|
| 3,371,526 | 3/1968 | Fathauer | 73/862.64 X |
| 3,443,653 | 5/1969 | Marshall | |
| 3,590,933 | 7/1971 | Forman | |
| 3,986,571 | 10/1976 | Strobel | |
| 4,020,686 | 5/1977 | Brendel | |
| 4,022,288 | 5/1977 | Canevari | |
| 4,062,416 | 12/1977 | Berg et al. | |
| 4,062,417 | 12/1977 | Kunz | |
| 4,065,962 | 1/1978 | Shoberg | |
| 4,072,202 | 2/1978 | Storace | |
| 4,143,727 | 3/1979 | Jacobson | |
| 4,153,124 | 5/1979 | Knothe et al. | |
| 4,153,126 | 5/1979 | Knothe et al. | |
| 4,168,518 | 9/1979 | Lee | 73/862.64 X |
| 4,170,270 | 10/1979 | Sette et al. | |
| 4,184,557 | 1/1980 | Kunz | |
| 4,237,989 | 12/1980 | Lewis | 73/862.64 |
| 4,308,929 | 1/1982 | Estavoyer | 177/210 C X |
| 4,344,496 | 8/1982 | Langlais et al. | 177/210 C |

Primary Examiner—Charles A. Ruehl

Attorney, Agent, or Firm—Kenway & Jenney

[57] ABSTRACT

A force transducer includes a pair of rigid force summing members that each extend toward one another along a central axis and a pair of beam members that each extend along the central axis and couple the force summing members to form a parallelogram frame. More specifically, the beam members are mounted to the force summing members to provide a frame such that a force applied to one force summing member along a first reference axis and resisted on the opposite side of the other force summing member produces a flexing of the beam members. The force summing members each include sensing members that also extend along the central axis toward one another. The sensing members are spaced from one another in the direction of the first reference axis. Electrically conductive members mounted on the opposite faces of the sensor form a variable gap capacitor that is integral with the frame. The flexing of the frame produces a change in the gap that relates to the applied force. The force summing and beam members are formed of a dielectric material. In one form each beam member is integral with an associated force summing member, the beam member being defined by an open slot. In one form of the construction the beam member portions associated with each force summing member are joined at a point of inflection (i.e. the zero bending moment point) of the beam as joined. In the preferred form, the beam members and the associated force summing members are integral, monolithic and each force summing member and associated beam and sensor portions is identical to the other.

25 Claims, 12 Drawing Figures

FORCE TRANSDUCER

REFERENCE TO RELATED APPLICATION

The subject matter of this application is related to that of U.S. Pat. No. 4,382,479 Weighing System, filed on even date herewith.

BACKGROUND OF THE INVENTION

The present invention is in the field of transducers, and more particularly relates to high resolution, high accuracy force transducers.

One prior art form of force or weight sensing utilizes a feedback approach using a movable coil in a fixed magnetic field. The coil is movable along a sensing axis and is driven by a current sufficient to maintain a fixed position along the sensing axis. In this configuration, the coil drive current provides a measure of forces applied to displace that coil. While this approach is generally effective, the force sensing configuraton is relatively complex and correspondingly expensive.

Another form in the prior art is a strain gage load cell. In this form, however, the accuracy of the load cell is limited by hysteresis and creep of the strain gage sensor material, as well as that of bonding material for the sensor.

Yet another force sensing approach utilizes a variable capacitance type load cell, wherein a pair of opposed, substantially parallel, conductive plates are coupled so that the force-to-be-measured causes a separation of those opposed conductor plates in a manner which is proportional to an applied force. While in principle this approach is satisfactory, there are no straight forward assemblies known in the prior art which adequately maintain the sensing plates parallel over a range of forces.

Accordingly, it is an object of this invention to provide an improved force sensor.

It is another object to provide a variable capacitance force sensor.

SUMMARY OF THE INVENTION

Briefly, in accordance with the present invention, a force transducer includes a pair of opposed rigid-body force summing members lying along a central axis. Each of these summing members includes a sensor member extending along the central axis toward the other summing member. These sensor members include opposing sensing portions which are mutually offset in the direction of a first reference axis perpendicular to the central axis. A pair of beam members extend between and couple the force summing members, with one beam member being on one side of the sensor members and the other beam member being on the other side of the sensor member. The beam members are flexible about axes parallel to a second reference axis (perpendicular to the first reference and central axes), and are substantially rigid otherwise. In the preferred form of the invention, the beam members are sustantially equal in length, and the distance between their points of coupling to the sensor members are substantially equal, so that the beam members are generally parallel.

In one form of the invention, each of the opposing sensor portions supports an electrically conductive member, in a manner providing a pair of opposed, substantially parallel, planar conductive surfaces. The conductive surfaces are offset in the direction of the first reference axis, and also are parallel to the second reference axis. In this form of the invention, the force transducer may be a monolithic dielectric structure with the conductive members being thin conductive films deposited on the opposed portions of the sensor members.

In this configuration, the force transducer may be supported at one summing member by a force parallel to the first reference axis. A force-to-be-measured is applied to the other summing members parallel to that first reference axis. As that force is applied to the summing members, the beam members deform, due to their flexibility about axes parallel to the second reference axis. As the beam members deform, the sensing members and the conducting members supported by those sensing members are displaced with respect to each other in the direction of the first reference axis, while maintaining their parallel relationship. The capacitance of the effective parallel plate capacitor formed by these conductive members may be measured conventionally. The measured capacitance value is inversely proportional to the separation of the plates, and thus the force-to-be-measured.

The force transducers of the present invention may be characterized by relatively low hysteresis, and very low creep under load, for example, where the force transducer is a monolithic structure made out of quartz. In that form, there is relatively low thermally induced change in capacitance for given forces applied to the summing members. The force transducer is responsive primarily to the net force from the single sensing (first reference) axis, and has a relatively high rejection ratio for forces and moments in other planes.

The force transducer of the present invention may be used as a force sensor in the form of a load cell for direct measurement of force. Alternatively, the transducer may be used to sense other forces such as inertial forces (when used in conjunction with a mass), or pressures when used in conjuction with a diaphragm.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
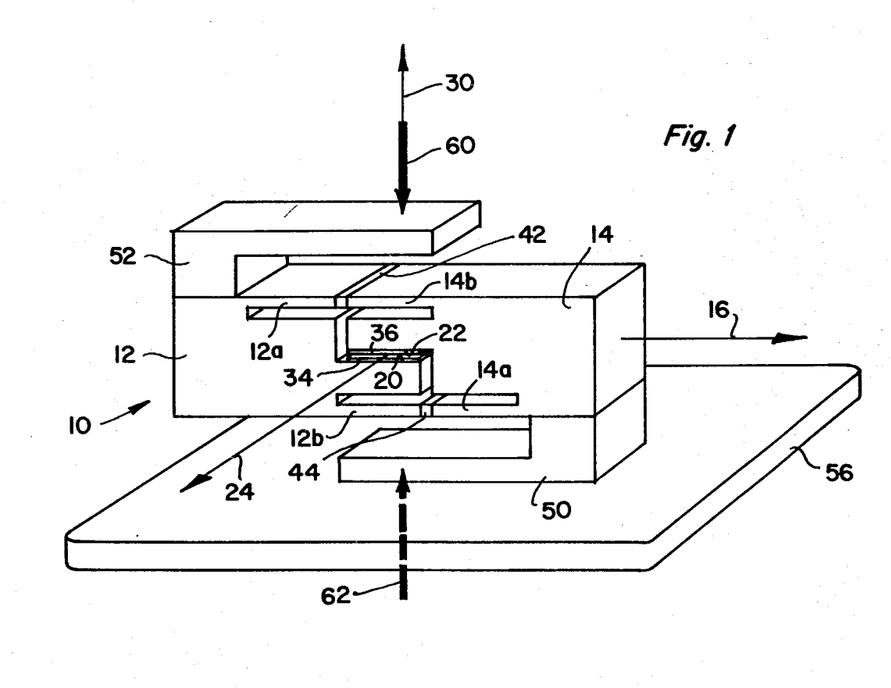
FIG. 1 shows an exemplary force transducer in accordance with the present invention.

FIG. 1 shows a preferred form of a transducer 10 in accordance with the present invention. The transducer 10 includes a pair of rectangular cross-section, elongated members 12 and 14, extending along a common central axis 16. Elongated member 12 is shown also in FIG. 2. Members 12 and 14 include complementary faces at their adjacent ends. As shown, the entire end portions of members 12 and 14 form the complementary faces, although in other embodiments, the complementary faces may be only a portion of the adjacent ends.

In the illustrated embodiment, the faces of members 12 and 14 include planar portions 20 and 22, respectively, which are offset in the direction of a first reference axis 30, which axis is perpendicular to central axis 16. The planar portions 20 and 22 are parallel to a second reference axis 24, which is perpendicular to axes 16 and 30. In the preferred embodiment, the planar portions 20 and 22 are also parallel to central axis 16, although in other embodiments, the planar portions may be angularly offset from axis 16. As shown, the faces on either side of faces 20 and 22 are parallel to axis 30 and perpendicular to axis 16, although other orientations of these faces might also be used. In the present embodiment, members 12 and 14 are substantially identical. These members are joined to form the transducer 10.

The elongated members 12 and 14 each include two planar slots extending from their complementary faces in planes parallel to the axes 16 and 24. FIG. 3 show a form for member 12 similar to that of FIGS. 1 and 2 but where the slots are not in planes parallel to axes 16 and 24.

Figure 2:
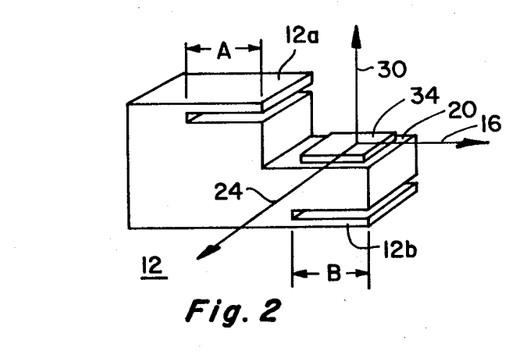
FIG. 2 shows one of the force summing members and beam portions of the embodiment of FIG. 1.
Figure 3:
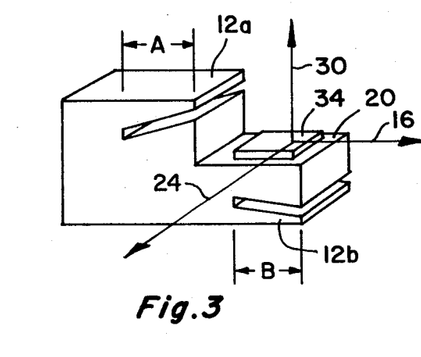
FIG. 3 shows an alternative form of force summing member for the present invention.

In the embodiment illustrated in FIGS. 1 and 2, both slots in each of members 12 and 14 are of identical depth. However, in other embodiments, in each of members 12 and 14, one slot may have a depth A and the other slot may have a depth B, where at least one of A and B is non-zero and where the sum of A + B equals a predetermined value. Moreover, the two slots in member 12 are spaced apart in the direction of axis 30 so that the upper beam portion 12a and the lower beam portion 12b of member 12 (i.e. the beam portions bounded by the slots and outer surfaces of member 12) are relatively flexible in response to moments about axes parallel to the axis 24.

In the present embodiment, members 12 and 14 are substantially identical. As a result, the two slots of member 14 are considered to define "upper" beam portion 14a and "lower" beam portion 14b.

The planar portions 20 and 22 of members 12 and 14 each support one of substantially planar electrically conductive members 34 and 36.

The upper beam portion 12a and lower beam portion 14b of members 12 and 14, respectively, are joined by member 42 and the lower beam portion 12b and upper beam portion 14a of membes 12 and 14, respectively, are joined by member 44. In the resultant configuration, the complementary faces of members 12 and 14 are mutually offset in the direction of axis 16 and the opposed conductive surfaces of members 34 and 36 are mutually offset in the direction of axis 30. In the preferred form, the members 12 and 14 are quartz, and the adjoining members, 42 and 44, are also quartz so that the members may all be fused together to form a monolithic structure. In alternate embodiments, other materials, such as titanium silicate, ceramics or other dielectric materials may be used.

As shown in FIG. 1, the transducer 10 also includes a rigid support member 50 rigidly attached to member 14 and a rigid input force member 52 rigidly attached to member 12. These members 50 and 52 may also be quartz and fused to the respective ones of blocks 12 and 14. The support member 50 is coupled to the upper planar surface of a transducer support element 56.

Figures 4, 5:
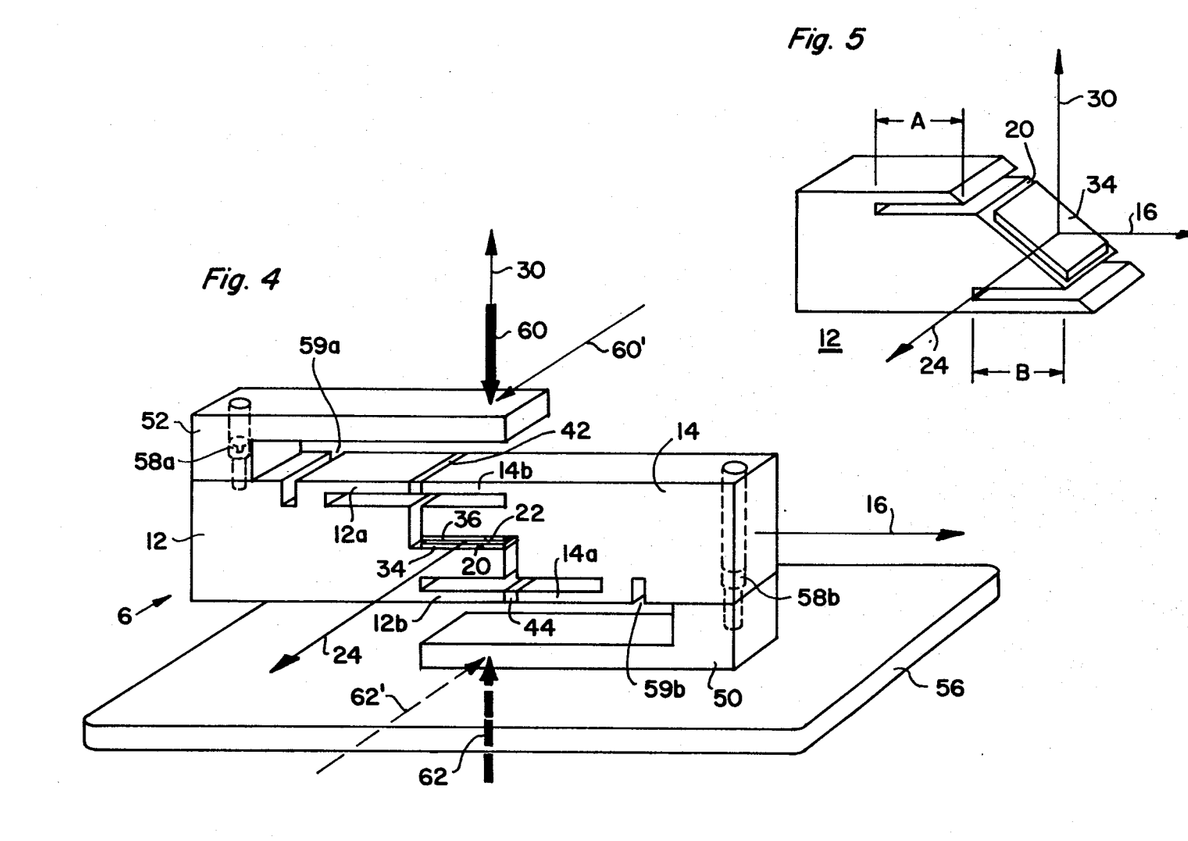
FIG. 4 shows an alternate form of force transducer according to the present invention.
FIG. 5 shows an alternative form of force summing member for the present invention.

FIG. 4 shows an alternate form of the invention which is similar to that of FIG. 1 but where members 50 and 52 are metal members which are mechanically coupled (by screws 58a and 58b) to the summing members 12 and 14. in this form stress isolation grooves 59a and 59b isolate stress from the mounting screws.

In operation of the transducer of FIG. 1, a force-to-be-measured, indicated by arrow 60, is applied along axis 30 to input member 52. That force is transmitted to the left hand (as illustrated) portion of member 12. In response to the applied force applied to member 52, an equal and opposite force (indicated by arrow 62 is applied to the support member 50 at the upper surface of element 56. The latter force is transmitted to the right hand (as illustrated) portion of member 14. In response to the force pair applied to the transducer 10, the upper and lower beam members of transducer 10 deform in a manner so that the conductive members 34 and 36 separate by a distance related to the magnitude of the force pair applied to the transducer 10, while maintaining their parallel relationship. The magnitude of the capacitance of the effective capacitor formed by members 34 and 36 may be measured conventionally, and provides a measure of the force applied to member 52.

Because the transducer 18 is highly resistant to moments and forces in directions other than along axis 30, the applied force pair (represented by arrows 60 and 62) need not be along axis 30. For example, with forces in the directions of broken arrows 60' and 62' of FIG. 1, the separation between conductive members 34 and 36 is inversely proportional to the applied force components in direction of axis 30.

As the upper and lower beam members deform, there is stress in those members. In the illustrated embodiment, due to the symmetry of the system where the slot depths A and B are equal and blocks 12 and 14 are substantially similar, the junction formed by the joining members 42 and 44 occur at bending stress inflection points, i.e. where bending moments are zero. In other forms of the invention, for example, where the slot depths A and B differ and particularly where one of the slot depths A or B may equal zero, the junction of the elements does not occur at these stress inflection points. However, the preferred form shown in FIG. 1 has this characteristic. Under this condition, the junction formed by joining members 42 and 44 is lightly stressed and a relatively low quality, and thus inexpensive, junction may be used.

Where the invention is constructed from quartz, for example, the force transducer 10 is characterized by very low hysteresis and very low creep under load, with precision index on the order of $10^{-5}$ to $10^{-6}$. Moreover, the device is characterized by a relatively low thermally-induced changing capacitance.

The force transducer 10 generally responds only to net force along the single axis 30 and maintains a relatively high rejection ratio for forces in other planes. The elements 12 and 14 of the present embodiment may be readily constructed of a rectangular elongated quartz block which is cut to form the complementary surfaces. The two blocks having those complementary surfaces merely have a pair of slots cut to form the upper and lower beam portions. The beam portion-forming slots may be on opposite sides as the sensing portion, as shown, or may be on the same side.

The blocks are joined to form a transducer by joining the beam portions, for example, by fusion, to form a rugged, monolithic structure. In other forms of the invention, other materials, including metals, may be used for members 12 and 14, provided at least one of members 34 and 36 is insulated from the other. The elements 50 and 52 may be metal or other material.

FIG. 5 shows another form for members 12 and 14 for use in the present invention which uses single cut, complementary faces. In this form of the invention, the member 14 is substantially identical to member 12. The conductive members 34 and 36 lie on opposing portions of the planar faces 20 and 22 between the respective slots on the members 12 and 14. The operation of a transducer with this configuration is substantially the same as that described in conjunction with FIG. 1, except that there is a cosine scale factor for the capacitance. In yet other embodiments of the invention, for example, the members 12 and 14 may have generally circular cross-sections as opposed to the rectangular cross-sections shown in FIGS. 1-3.

FIGS. 6A, 6B, 6C and FIGS. 7-10 show a number of alternative embodiments for the present invention. In these latter figures, elements corresponding to elements in FIGS. 1-3 have the same reference designations. In FIGS. 6A, 6B, 6C and 7-10, the transducer 10 is formed generally from two sections 12 and 14 of a cylindrical rod extending along a central axis 16, where the two sections 12 and 14 have complementary faces at their adjacent ends. The complementary faces include at least one pair of opposed portions 20 and 22 which are offset in the direction parallel to first reference axis 30 and are parallel to second reference axis 24. In this exemplary embodiment, protions 20 and 22 are planar. In alternate embodiments, the portions 20 and 22 may be other than planar, for example they might be spherical sections. Each of the planar portions 20 and 22 supports one of planar electrically conductive members 34 and 36.

In the embodiments of FIGS. 6A, 6B, 6C and 7-10, substantially equal length and parallel upper and lower beam members 70 and 72 extend between and couple the members 12 and 14. Beam members 70 and 72 are relatively flexible about axes parallel to axis 24.

The beam members 70 and 72 are coupled at each of their ends to one of members 12 and 14 by beads extending from members 12 and 14. In effect, beam member 70 is coupled along axes 76 and 78 which are parallel to axis 24, and beam member 72 is coupled along axes 80 and 82 which are parallel to axis 24. Axes 76 and 78 are separated by the same distance on axis 16 as axes 80 and 82. Moreover, axes 76 and 80 are separated by substantially the same distance along axis 30 as are axes 78 and 82. In the embodiments of all of FIGS. 6A, 6B, 6C and 7-10, the elements may be of a single material, such as quartz, and may be fused together to form a monolithic structure.

As shown, the upper and lower beam members 70 and 72 are on opposite sides of members 12 and 14. In alternate embodiments, beam members 70 and 72 may be on the same side of members 12 and 14, for example in a structure similar to that of FIG. 6A but where beam 72 (and axes 80 and 82) are above and coupled by beads to beam 70.

Figure 6A:
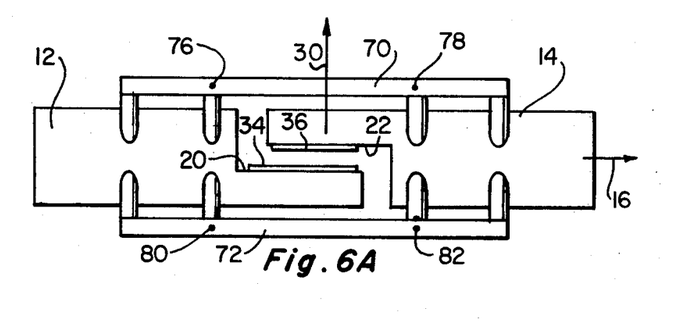
FIG. 6A shows a side view of an alternate embodiment of the present invention.
Figure 6B:
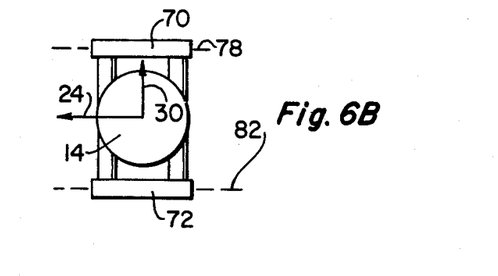
FIGS. 6B and 6C show end and top views respectively of the embodiment of FIG. 6A.
Figure 6C:
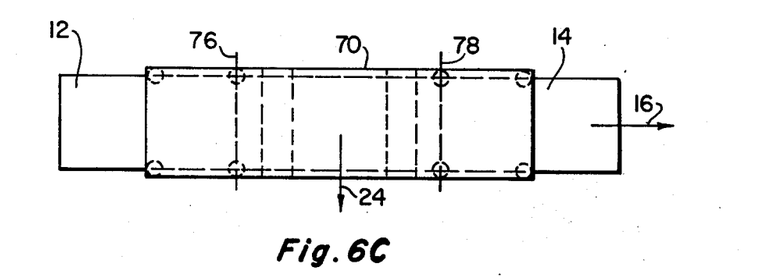

In the embodiment of FIGS. 6A-6C, beam members 70 and 72 include extension portions at each end which are coupled to members 12 and 14 by beads. The resultant couplings, where the beam members are coupled to one of members 12 and 14 at spaced apart (along axis 16) locations, are moment resistant. The moment-resisting coupling of the extension portions to one of members 12 and 14 minimizes stress at the joints.

Figure 7:
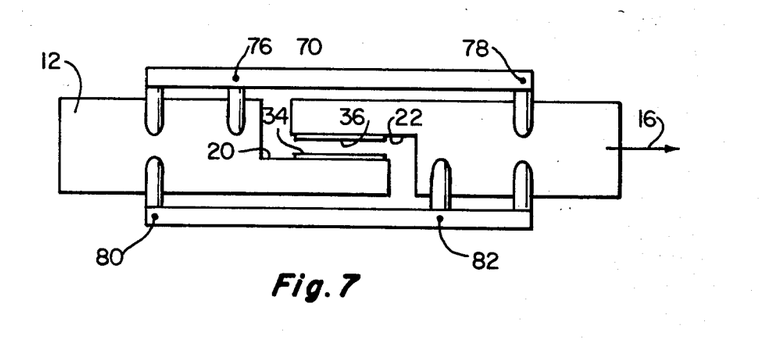
FIGS. 7-10 show alternative embodiments of the present invention.

In the embodiment of FIG. 7, on pair of diagonally opposed "moment-resisting" couplings is used with one pair of diagonally non-moment resisting couplings.

Figure 8:
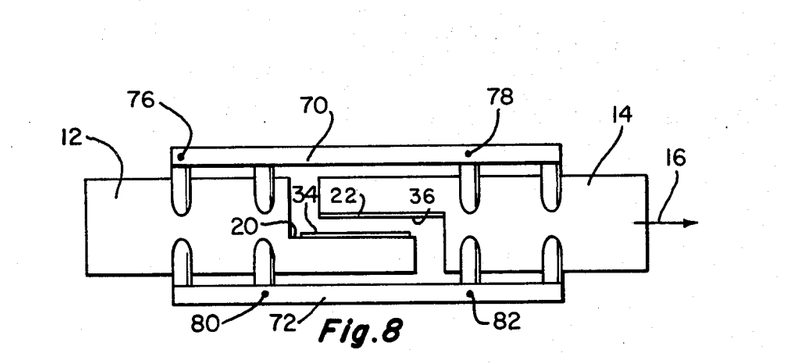

In the embodiment of FIG. 8, one pair of straight opposed moment-resisting couplings is used with one pair of straight opposed non-moment resisting couplings.

Figure 9:
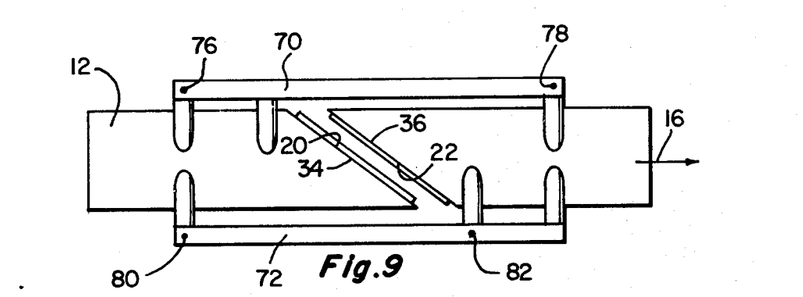

The embodiment of FIG. 9 is similar to that of FIG. 7, except that the complementary faces of members 12 and 14 is a single cut plane.

Figure 10:
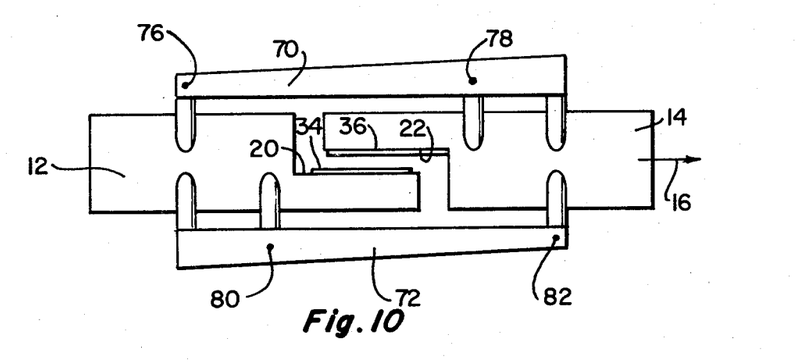

The embodiment of FIG. 10 is similar to that of FIG. 7, except that beam members 70 and 72 are tapered.

The invention may be embodied in other specific forms without departing from the spirit or essential charcteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A force transducer comprising:
   A. a pair of opposed, rigid force summing members formed of a dielectric material, each of said summing members including a sensor member extending therefrom in the direction of a central axis, toward the other summing member, said sensor members including opposing sensing portions mutually offset in the direction of a first reference axis, said first reference axis being perpendicular to said central axis,
   B. a first beam member formed of a dielectric material and extending between and coupling said force summing members, said first beam member being relatively flexible along its length about axes parallel to a second reference axis, said second reference axis being perpendicular to said central and first reference axes, and said first beam member being substantially rigid otherwise,
   C. a second beam member formed of dielectric material and extending between and coupling said force summing members, said second beam member being relatively feasible along its length about axes parallel to said second reference axis and being substantially rigid otherwise,
   D. said first and second beam members and said said force summing members forming a parallelogram structure that flexes elastically in response to said force applied generally along said first reference axis while at least one of said couplings between said first and second beam members and said force summing members being moment resisting to enable at least one of said first and second beam members to resist externally applied forces, whereby relative movement of said sensing portions is related to the forces applied to said summing members, and
   E. an electrically conductive member on each of said sensing portions, said conductive members providing opposed, substantially parallel surfaces, said surfaces being offset in the direction of said first reference axis, whereby the capacitance associated with the conductive members is related to the forces applied to said force summing members.

2. A force transducer according to claim 1 wherein said opposed parallel surfaces are planar and parallel to said second reference axis.

3. A force sensor according to claim 2 wherein said surfaces are parallel to said central axis.

4. A force sensor according to claim 2 wherein said surfaces are angularly offset from said central axis.

5. A force transducer according to claim 1 wherein said first and second beam members are substantially equal in length, and wherein the distance between the points of coupling of said first and second beam members at one summing member are substantially equal to the distance between the points of coupling of said first and second beam members at the other summing member.

6. A force transducer according to claims 1 or 5 wherein said summing members and said beam members are monolithic and said beam members flex elastically to resist said force.

7. A force transducer according to claim 1 wherein said first and second beam members are on opposite sides of said sensing portions.

8. A force transducer according to claims 1 or 5 or 7 wherein said opposing sensing portions are planar and parallel to said second reference axis.

9. A force sensor according to claim 8 wherein said surfaces are planar and said surfaces are parallel to said central axis.

10. A force sensor according to claim 8 wherein said surfaces are planar and said surfaces are angularly offset from said central axis.

11. A force transducer according to claim 1 wherein said dielectric material is quartz.

12. A force transducer according to claim 1 wherein said dielectric material is a ceramic material.

13. A force sensor according to claim 1 wherein said conductive members are thin films.

14. A force transducer comprising:
A. a pair of elongated members, each of said members extending along a common central axis and having at least in part complementary faces at their adjacent ends, each complementary face having at least one sensing portion angularly offset from said central axis by less than ninety degrees, wherein each elongated member includes a pair of planar slots extending from its complementary face, the first slot having depth A and the second slot having depth B, said second slot being spaced apart in the direction of a first reference axis from said first slot, said first reference axis being perpendicular to said central axis,
whereby upper and lower beam portions of said elongated member are relatively flexible about axes parallel to a second reference axis, said second reference axis being perpendicular to said central axis and said first reference axis, said upper beam portion being bounded on one side by said first slot and on the other side by a surface portion of said elongated member, and said lower beam portion being bounded on one side by said second slot and on the other side by a surface portion of said elongated member,
B. means for joining the upper beam portion of each said pair of elongated members and the lower beam portions of the other of said pair of elongated members to form a monolithic structure, wherein said complementary faces are mutually offset in the direction of said first reference axis, and are movable in the direction parallel to said first reference axis and relatively immovable otherwise,
C. a planar electrically conductive member on said sensing portions of said complementary faces,
whereby the capacitance associated with said conductive members is related to the forces applied to said pair of elongated members.

15. A force transducer according to claim 14 wherein the slots of said elongated members are parallel.

16. A force transducer according to claim 14 wherein said complementary faces include at least one planar face which is parallel to said second reference axis.

17. A force transducer according to claim 16 wherein said complementary faces are wholly planar and the plane of said faces is angularly offset from said central axis.

18. A force transducer according to claim 16 wherein said complementary faces include first and second planar sub-faces, and said first and second sub-faces being mutually displaced along said central axis wherein said first sub-face includes said first slot and said second sub-face includes said second slot, and wherein said complementary faces include a third planar sub-face between said first and second sub-faces, said third sub-face supporting said conductive member.

19. A force transducer according to claim 18 wherein said third sub-face is substantially parallel to said central and second reference axes.

20. A force transducer according to claim 18 wherein said third sub-face is substantially parallel to said second reference axis and is angularly offset from said central axis.

21. A force transducer according to claims 14 or 16 wherein A + B equals a predetermined value.

22. A force transducer according to claims 15 or 17 or 18 wherein A = B.

23. A force transducer according to claim 14 wherein said means for joining is located at the point of inflection of the upper beam portion and the lower beam portion thus joined when said upper and lower beam portions are flexed in response to said force.

24. A force transducer according to claim 14 wherein said pair of members and their associated upper and lower beam portions are substantially identical.

25. A force transducer comprising:
A. a pair of elongated members, each of said members extending along a common central axis and having at least in part, complementary faces at their adjacent ends, each complementary face having at least one sensing portion angularly offset from said central axis by less than ninety degrees, wherein each elongated member includes at least one planar slot extending from its complementary face,
whereby upper and lower beam portions of said elongated member are spaced apart from each other in a direction of a first reference axis, said first reference axis being perpendicular to said central axis, said upper and lower beam portions being relatively flexible about axes parallel to a second reference axis, said second reference axis being perpendicular to said central axis and said first reference axis,
B. means for joining the upper beam portion of each of said pair of elongated members and the lower beam portions of the other said pair of elongated members to form a monolithic structure, wherein said complementary faces are mutually offset in the direction of said first reference axis, and are moveable in the direction parallel to said first reference axis and relatively immoveable otherwise, C. a planar electrically conductive member on said sensing portions of said complementary faces, whereby the capacitance associated with said conductive members is related to the forces applied to said pair of elongated members.

* * * * *

UNITED STATES PATENT AND TRADEMARK OFFICE
CERTIFICATE OF CORRECTION

PATENT NO. : 4,448,085
DATED : May 15, 1984
INVENTOR(S) : Shih-Ying Lee

It is certified that error appears in the above-identified patent and that said Letters Patent are hereby corrected as shown below:

Column 1, line 33, "straight forward" should be --straightforward;

Column 1, line 55, "member" should be --members--;

Column 3, line 7, "members" should be --member--;

Column 3, line 52, "membes" should be --members--;

Column 6, line 47, "feasible" should be --flexible--.

Signed and Sealed this

Twenty-eighth Day of January 1986

[SEAL]

Attest:

DONALD J. QUIGG

Attesting Officer    Commissioner of Patents and Trademarks